United States Patent Office 3,608,363
Patented Sept. 28, 1971

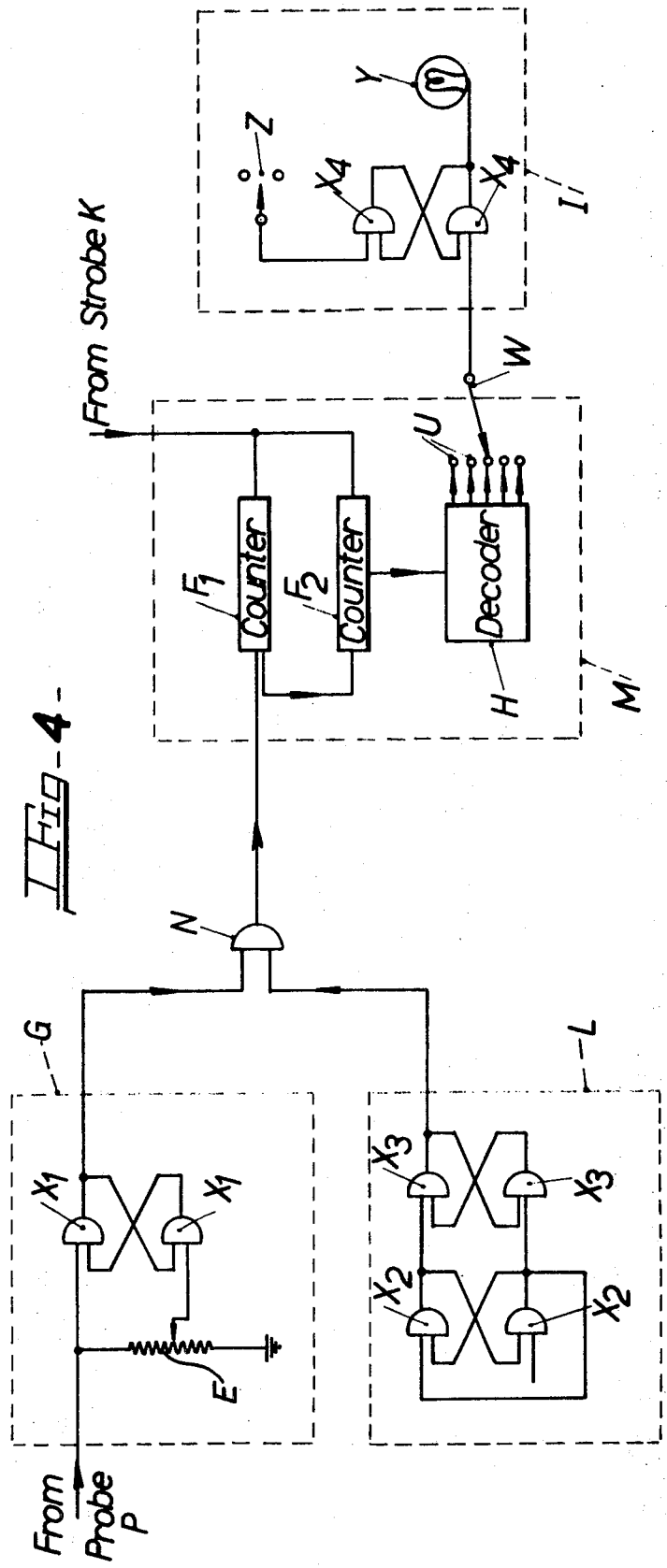

3,608,363
METHOD OF DETECTING THE PRESENCE OF FLAWS IN TUBES BY USING ULTRASONIC PULSES, AND APPARATUS FOR USE IN CARRYING OUT THE METHOD
Keith R. Whittington, Great Shelford, England, assignor to T. I. (Group Services) Limited, Birmingham, England
Filed Jan. 31, 1969, Ser. No. 795,580
Claims priority, application Great Britain, Feb. 2, 1968, 5,437/68
Int. Cl. G01n 29/04
U.S. Cl. 73—67.9           20 Claims

ABSTRACT OF THE DISCLOSURE

A method of detecting the presence of flaws in tubes by using ultrasonic pulses, and apparatus for carrying out the method. The ultrasonic pulses are emitted by an ultrasonic probe which also picks up the reflected ultrasonic pulses resulting from each transmitted pulse, the reflected ultrasonic pulses creating electrical signals in the probe. The invention makes use of the fact that at any reasonable amplitude level, the total width of the electrical pulse signals corresponding to the ultrasonic pulses reflected from the surfaces of a tube, remains substantially constant irrespective of the thickness of the tube or the contours of its surface. The presence or absence of a flaw at a test point in the tube may therefore be determined by measuring the total width of all electrical pulse signals occurring within a time interval which is sufficient to include the electrical pulse signals caused by the first reflected ultrasonic pulses of a single initial ultrasonic pulse from the inner and outer surfaces of the tube. If this width is greater than the said constant total width of electrical pulse signals due to surface reflections alone, then it is presumed that a flaw is present in the tube at that test point on the tube. The width of each electrical pulse signal is measured digitally by using it to gate a clock waveform and to count the resulting clock pulses. Clock pulses only pass to the counting unit when the amplitude of an electrical pulse signal is above a predetermined amplitude or trigger level which can be set so that only the larger flaws are detected. The time interval over which clock pulses are counted is controlled by a strobe signal.

Figure 1:
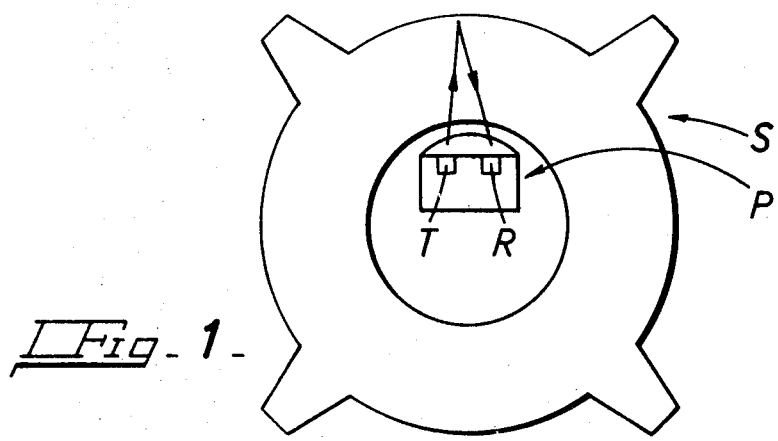

This invention relates to a method of detecting the presence of flaws in tubes by using ultrasonic pulses, and apparatus for use in carrying out the method. This invention has been developed for the testing of finned tubing but is of general application.

Hitherto the normal method of detecting the presence of flaws in a tube by using ultrasonic pulses has been to direct the pulses into the wall of the tube and to detect the individual pulses that are reflected from the flaws. The pulses are produced by an ultrasonic transducer, and a second ultrasonic transducer acts as the detector and converts the ultrasonic pulses received into electrical pulse signals. These two transducers are kept in a constant spaced relation to one another and together form an ultrasonic probe. This probe is moved relatively to the tube to test for flaws at all points in the tube. The tube and probe are immersed in a tank of water during this testing process as water provides a coupling medium for ultrasonic pulses which pass from the probe into the tube wall.

In order to avoid spurious results being obtained by this method, it is necessary to distinguish between the ultrasonic pulses reflected from flaws and those ultrasonic pulses which result from the reflection of the initial ultrasonic pulses from the inner and outer surfaces of the tube. This can be easily accomplished where the tube is cylindrical, as the times of arrival at the probe, of the ultrasonic pulses from the surfaces of the tube, define the extreme limits between which ultrasonic pulses from flaws can be detected and furthermore the interval defined by these extreme limits will remain reasonably constant no matter where the probe is positioned on the tube. This latter fact results from the constant thickness of the tube wall and allows a strobe signal to be set to gate the electrical pulse signals produced in the probe so as to allow only the pulse signals corresponding to flaws to be fed into a device which provides a warning signal when a flaw is detected.

With a tube having one of its surfaces of variable contour, such as a finned tube, the above method cannot be used effectively as the thickness of the wall of the tube would vary and thus the said time interval would also vary. To avoid this difficulty, however, the strobe signal may be set to gate pulse signals corresponding to flaws, at the minimum time interval that arises during testing but this means that there are periods during longer time intervals when the presence of such pulse signals will go undetected. For a finned tube in which the probe moves around the inner cylindrical surface of the tube, this means that the fins themselves will not be tested for flaws. Further with the above method it is impossible to set the strobe signal to differentiate between a pulse signal resulting from the presence of a flaw, and a pulse signal resulting from an ultrasonic pulse reflected from the surface of the tube, when these two signals partly merge into one another. This will arise where flaws lie on or close to the surface of the tube.

One object of the present invention is to overcome or reduce these disadvantages.

From one aspect the present invention consists in a method of detecting the presence of flaws in tubes by using ultrasonic pulses, comprising the steps of scanning an ultrasonic probe across a smoothly contoured surface of the tube by moving the probe and tube relative to one another; periodically transmitting an ultrasonic pulse into the wall of the tube and receiving a succession of reflected ultrasonic pulses resulting from each transmitted ultrasonic pulse; measuring the pulse width of each reflected ultrasonic pulse which is received during a detecting period by measuring the time during which the amplitude of each reflected ultrasonic pulse exceeds a preselected minimum amplitude; summing the pulse widths of all the reflected ultrasonic pulses received during the said detecting period to obtain a total pulse width; and comparing the total pulse width with a predetermined standard total pulse width representative of a flaw-free tube.

From another aspect the present invention consists in apparatus for detecting the presence of flaws in tubes by using ultrasonic pulses, and which comprises an ultrasonic probe; means for moving the probe relative to the tube so that it scans along a path across a smoothly contoured surface of the tube; means to energise the probe so that it transmits an ultrasonic pulse into the wall of the tube at spaced intervals of time; measuring means to receive from the probe an electrical output signal which is generated by a succession of reflected ultrasonic pulses resulting from each transmitted ultrasonic pulse, and to analyse this signal so as to measure the pulse width of each reflected ultrasonic pulse by measuring the time during which the amplitude of each reflected ultrasonic pulse exceeds a preselected minimum amplitude; summing means to sum the pulse widths of the reflected ultrasonic pulses as measured by the measuring means so as to obtain a total pulse width; control means which defines a detecting period during which the summing means sums the pulse widths of all the reflected ultrasonic pulses received at the probe; and comparison means to compare the total pulse width recorded by the summing means at the end of a detecting period with a predetermined standard total pulse width representative of a flaw-free tube.

The invention makes use of the fact that at any reasonable amplitude level, the total width of those electrical pulse signals from the ultrasonic probe which arise from the ultrasonic pulses reflected from the surfaces of a tube, remains substantially constant irrespective of the thickness of the tube or the contours of its surface. The presence or absence of a flaw at a test point in the tube may therefore be determined by measuring the total width of all electrical pulse signals occurring within a time interval which is sufficient to include the electrical pulse signals caused by the first reflected ultrasonic pulses of a single initial ultrasonic pulse from the inner and outer surfaces of the tube. If this width is greater than the said constant total width of electrical pulse signals due to surface reflections alone, then it is presumed that a flaw is present in the tube at that test point on the tube.

The width of each electrical pulse signal is measured digitally by using it to gate a clock waveform and to count the resulting clock pulses. Clock pulses only pass to the counting unit when the amplitude of an electrical pulse signal is above a predetermined amplitude or trigger level which can be set so that only the larger flaws are detected. The time interval over which clock pulses are counted is controlled by the strobe signal which is applied to the counting unit and is set so that all clock pulses corresponding to the first reflection of the transmitted ultrasonic pulse by the nearer surface of the tube to the pulse are counted at the beginning of the interval, and all clock pulses corresponding to the first reflection of the transmitted ultrasonic pulse from the farther surface of the tube from the probe are counted towards the end of the interval. The counting unit may activate a warning device when it has counted more than a predetermined number of clock pulses during the time interval, the counting unit being returned to its zero condition by the strobe signal at the end of the interval.

Figure 2:
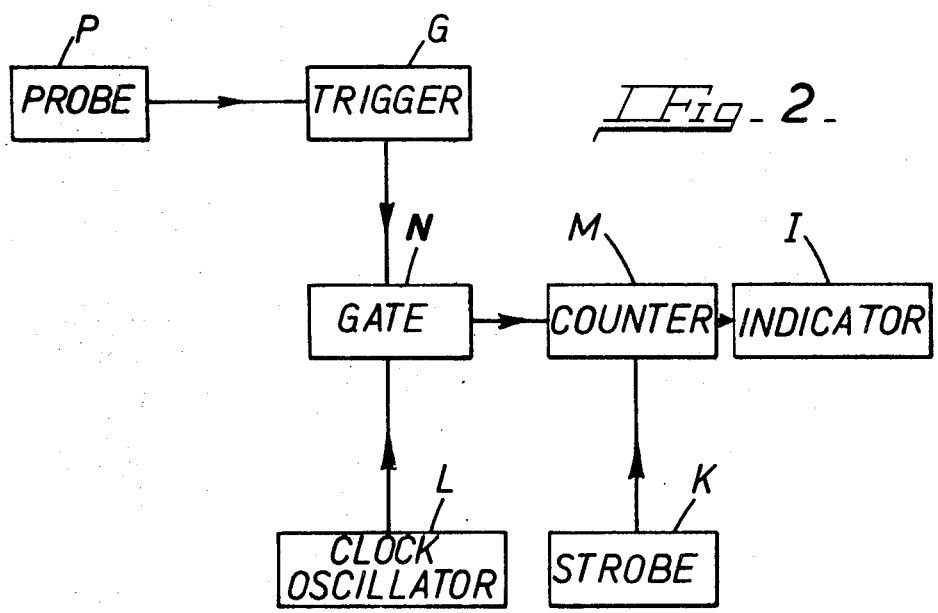
Figure 3:
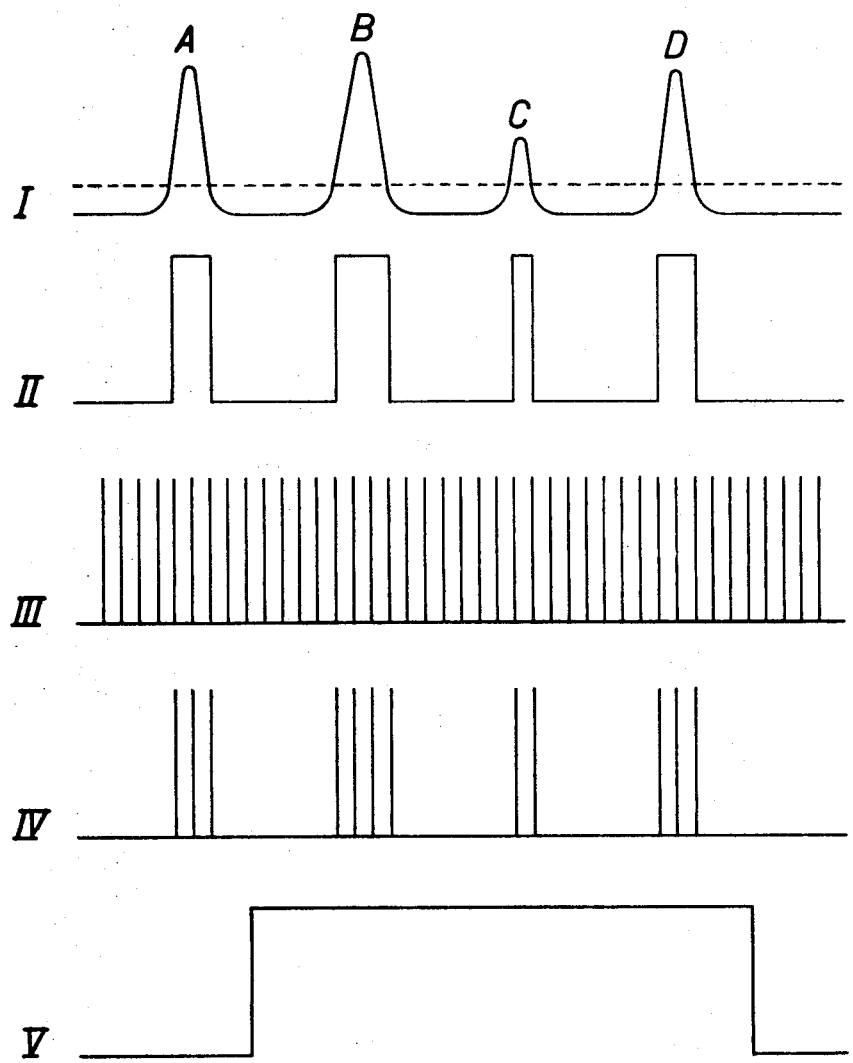

The invention is now described by way of example with reference to the accompanying drawings where:

FIG. 1 is a schematic diagram of an ultrasonic probe as used to test an externally finned tube, FIG. 2 is a block diagram of electrical apparatus in an embodiment of the invention, FIG. 3 shows the form of electrical pulses which arise in the apparatus of FIG. 2, and FIG. 4 is a schematic diagram which shows the electrical apparatus of FIG. 2 in more detail.

An externally finned tube S, shown in cross-section in FIG. 1, is tested for flaws using an ultrasonic probe P which is moved in a helical path relative to and in the bore of the tube, the probe being moved in a path parallel to the axis of the tube while the tube is rotated. Whilst the probe moves along this path ultrasonic pulses are emitted at regular intervals by a transducer T in the probe, each ultrasonic pulse passing into the wall of the tube and being reflected and received by a transducer R which is mounted in the probe alongside the transducer T. A plurality of reflected ultrasonic pulses will be produced by each transmitted ultrasonic pulse and these produce electrical pulse signals in the transducer R which are analysed in further electrical apparatus in order to determine whether or not a pulse is present which corresponds to an ultrasonic pulse reflected from a flaw in the wall of the tube S. The tube and probe are immersed in a tank of water during this testing process as water provides a coupling medium in order that ultrasonic pulses can pass from the probe into the tube wall.

The electrical apparatus used to analyse the electrical pulse signals from the probe is shown in schematic form in FIG. 2. The pulse signals first pass to a trigger circuit G which acts to pass an output signal of constant amplitude to the input of a gate N all the time that the amplitude of an input pulse signal is above a predetermined amplitude or trigger level. The gate N also has an input connection from a clock oscillator which produces a clock waveform comprising a train of regularly spaced square wave clock pulses at a frequency of say 6 mHz. These clock pulses are gated by the gate N under the control of the signal from the trigger circuit G so that clock pulses pass to the counter M all the time that the gate N receives an output signal from the trigger circuit G. The counter M counts all such clock pulses which it receives over a period of time set and triggered by a strobe signal from a strobe circuit K.

The manner in which the above apparatus functions to detect the presence of flaws in the tube S, can best be understood with reference to FIG. 3. Curve I in FIG. 3 shows the form of the electrical pulse signals produced in the probe following emission of a single ultrasonic pulse from the probe. Pulse signal A results from vibrations transmitted to the transducer R as the transducer T emits the initial ultrasonic pulse. Pulse signal B results from the first reflected ultrasonic pulse from the inner surface of the tube; pulse signal D results from the first reflected ultrasonic pulse from the outer, variably contoured, surface of the tube and pulse signal C results from a reflected ultrasonic pulse from a flaw in the wall of the tube. It is the presence of pulse signal C which the apparatus has to detect. The pulse signals are fed to the input of the trigger circuit G which has a trigger level shown by the dotted line in curve I so that the resulting output signal is as shown in curve II. Curve III shows the form of the clock signal from the clock oscillator L, each vertical stroke representing a square wave clock pulse. These clock pulses are gated by the gate N as described above to give an output signal as shown in curve IV which passes to the input of the counter. The counter is activated to count these clock pulses only when the strobe signal shown in curve V is applied to it and this strobe signal is such as to allow only those clock pulses corresponding to the pulse signals B, C and D to be counted. The total number of clock pulses counted gives a measure of the total width of the pulse signals B, C and D at the predetermined trigger level and as the total width contributed by the pulse signals B and D remains substantially constant at this trigger level irrespective of the thickness of the tube or the contours of its surface at the point tested by the probe, then any increase on this width can be taken to indicate the presence of a pulse signal such as C due to a flaw in the tube. Thus the counter is connected to indicating means I (see FIG. 2) which responds as soon as the counter records a number of clock pulses greater than the particular number corresponding to the normal width of the pulse signals. It will be appreciated that in this example the trigger level could be set so that the pulse signal C causes no clock pulses to be gated. Thus the trigger level can be used as an amplitude discriminator so as to control the type of flaws detected.

The strobe signal is set to switch on automatically at the correct time either by being triggered by the pulse signal A, or by an electrical signal which causes the transducer T to be energised to emit an ultrasonic pulse. Further the length of time for which the strobe signal needs to be maintained is determined by the maximum difference that can arise during the testing process between the times of arrival at the probe of the first reflected ultrasonic pulses from each of the two surfaces of the tube, i.e. the maximum possible time lag between the pulse signals B and D. This maximum difference arises where one of the reflected ultrasonic pulses is reflected at a portion of the outer surface of the tube at the apex of a fin. Switching off of the strobe signal at the end of the above determined time is used to reset the counter to zero so that when the strobe signal is next triggered, the counter starts from zero in measuring the width of the pulse signals due to reflected ultrasonic pulses from the next emitted ultrasonic pulse.

With reference to FIG. 4, the trigger circuit G preferably comprises a pair of NAND gates $X_1$ which are cross-coupled to provide positive feedback. The pulse signals are fed to the input of these NAND gates through a potentiometer E which opposes these pulse signals with a variable bias voltage corresponding to the trigger or amplitude setting. When a pulse signal is equal to or greater than the trigger setting a signal is fed to the input of the NAND gates and a positive output signal is obtained at the output of one of the NAND gates. The gate N is also a NAND gate and the output from the clock oscillator L is a square waveform with a frequency of 6 mHz. Thus a square wave output is obtained from the NAND gate N when there are simultaneous positive output signals from the trigger circuit G and the clock oscillator L.

A trigger circuit similar to the gate circuit G can also be used for the strobe circuit K, the circuit now functioning merely to provide a sharp-edged pulse of predetermined amplitude to operate the counter. Cross-coupled NAND gates can also be used to form the clock oscillator L FIG. 4, one such pair of gates $X_2$ with a positive feedback connection being used to form a sinusoidal oscillator and a second pair of such gates $X_3$ forming a bistable circuit to transform the sinusoidal output to a square wave output.

The counter M preferably comprises two series connected, integrated circuit decade counters F (as shown in FIG. 4) the first $F_1$ dividing by two and the second $F_2$ being connected to five output terminals U via a decoder unit H employing NAND gates such that the final outputs at these terminals have divide factors of 10, 12, 14, 16 and 18. These terminals U can be connected by a switch W to the indicating means I which comprises a bistable circuit formed by gates $X_4$ connected to a lamp Y. When a pulse from a counter output terminal U passes to the bistable circuit, it changes its state and the lamp lights. Another switch Z is provided to manually reset the bistable circuit and thus the lamp.

If the apparatus described above is in use and the trigger level is set so that the total width of those pulse signals due to reflected pulses from the inner and outer surfaces of the tube corresponds to 10 clock pulses (i.e. a width of 1.6 microseconds), then the switch between the counter output and the indicating means should be connected to the divide by 12 terminal of the counter output so that the lamp in the circuit will only light when a flaw is present in the tube at the point at which the probe is testing at that time.

From the example given above, it can be appreciated that the available range of divide factors must be chosen with reference to the expected total width of the pulse signals and the clock frequency. Thus if either the total width or clock frequency were doubled then the counters would receive twice as many clock pulses and would have to provide divide factors of twice the previous values in order that the apparatus should function as described. In fact the range of available divide factors may be made much wider than indicated above in order that for a given clock frequency the apparatus can be used over a wide range of total widths. Thus another form of the same apparatus employs a clock frequency of 12 mHz. and the counters provide a range of divide factors between 5 and 45.

It will also be appreciated that the apparatus as described above is only one form of possible apparatus that could be used according to the invention. For example other forms of gate circuit and counting circuit might equally well be used.

The invention has been described with reference to an externally finned tube, but the invention could equally well be applied to an internally finned tube, the probe then scanning the outer cylindrical surface of the tube. Also the invention as described above has been applied to the testing of a tube at individual points on the tube wall. This particular application allows the location of flaws in a tube to be found. The invention can, however, equally well be applied to the counting of the number of flaws present in a tube. Thus a probe could scan the tube and the counter could be controlled by the strobe signal to measure the total width of all pulse signals occurring during the scanning operation. The degree by which this width exceeds a predetermined width for the particular scanning operation performed, will give the number of flaws present over the scanned path.

I claim:

1. Apparatus for detecting the presence of flaws in tubes by using ultrasonic pulses, and which comprises an ultrasonic probe; means for moving the probe relative to a tube so that it scans along a path across a smoothly contoured surface of the tube; means to energise the probe so that it transmits an ultrasonic pulse into the wall of the tube at spaced intervals of time; measuring means to receive from the probe an electrical output signal which is generated by a succession of reflected ultrasonic pulses resulting from each transmitted ultrasonic pulse, and to analyse this signal so as to measure the pulse width of each reflected ultrasonic pulse by measuring the time during which the amplitude of each reflected ultrasonic pulse exceeds a preselected minimum amplitude; summing means to sum the pulse widths of the reflected ultrasonic pulses as measured by the measuring means so as to obtain a total pulse width; control means which defines a detecting period during which the summing means sums the pulse widths of all the reflected ultrasonic pulses received at the probe; and comparison means to compare the total pulse width recorded by the summing means at the end of a detecting period with a predetermined standard total pulse width representative of a flaw-free tube.

2. Apparatus as claimed in claim 1 in which the measuring means comprises an electric gate circuit which receives the electrical signal from the probe, and which is connected to an electric clock circuit adapted to generate a series of regularly spaced clock pulses, the gate circuit being adapted to allow clock pulses to pass all the time that the amplitude of the electrical signal is above a certain predetermined amplitude or trigger level; and in which the summing means is a counting unit which is operative to count all clock pulses which pass through the gate circuit during the detecting period as determined by the control means.

3. Apparatus as claimed in claim 2 in which the control means comprises a strobe circuit which feeds a strobe signal to the counting unit.

4. Apparatus as claimed in claim 3 in which the strobe circuit provides a sharp-edged pulse of predetermined amplitude and length.

5. Apparatus as claimed in claim 1 in which the gate circuit comprises a trigger circuit and a gate, the trigger circuit being fed with the electrical signal from the probe and acting to pass an output signal of constant amplitude to the input of the gate all the time that the amplitude of an input pulse signal is above a predetermined amplitude, the gate being fed with clock pulses from the clock circuit and being adapted to allow these clock pulses to pass through it all the time that there is an output signal from the trigger circuit.

6. Apparatus as claimed in claim 5 in which the trigger circuit comprises a pair of NAND gates which are cross-coupled to give positive feedback, and a potentiometer to which the input signal from the probe is applied and which opposes this signal with a variable bias voltage corresponding to the trigger or amplitude setting, the resultant signal being fed to the input of the NAND gates.

7. Apparatus as claimed in claim 6 in which the said gate is a NAND gate.

8. Apparatus as claimed in claim 2 in which the counting unit comprises two or more integrated circuit decade counters connected in series and giving a range of possible divided factors.

9. Apparatus as claimed in claim 2 in which the comparison unit comprises an indicating device which is connected to the counting unit and is responsive to the number of clock pulses registered by the counting unit and is activated when the number registered exceeds a predetermined number.

10. Apparatus as claimed in claim 9 in which the indicating means comprises a bistable circuit connected to a lamp, the lamp being switched on when the bistable circuit is in one state.

11. Apparatus as claimed in claim 4 in which the strobe circuit comprises a pair of NAND gates which are cross-coupled to give positive feedback, and a potentiometer to which pulses to trigger the strobe signal are applied and which opposes these pulses with a variable bias voltage the resultant signal being fed to the input of the NAND gates.

12. A method of detecting the presence of flaws in tubes using ultrasonic pulses comprising the steps of scanning an ultrasonic probe across a smoothly contoured surface of the tube by moving the probe and tube relative to one another; periodically transmitting an ultrasonic pulse into the wall of the tube and receiving a succession of reflected ultrasonic pulses resulting from each transmitted ultrasonic pulse; measuring the pulse width of each reflected ultrasonic pulse which is received during a detecting period by measuring the time during which the amplitude of each reflected ultrasonic pulse exceeds a preselected minimum amplitude; summing the pulse widths of all the reflected ultrasonic pulses received during the said detecting period to obtain a total pulse width; and comparing the total pulse width with a predetermined standard total pulse width representative of a flaw-free tube.

13. A method as claimed in claim 12 in which reflected ultrasonic pulses resulting from a succession of transmitted ultrasonic pulses are received during a single detecting period, and in which the pulse widths of all these reflected ultrasonic pulses are summed together.

14. A method as claimed in claim 12 in which reflected ultrasonic pulses resulting from a single transmitted ultrasonic pulse are received during each of a succession of detecting periods, and in which the pulse widths of reflected ultrasonic pulses received during each period are summed separately.

15. A method as claimed in claim 14 in which the reflected ultrasonic pulses received during each detecting period are the first reflected ultrasonic pulse from the nearer surface of the tube, the first reflected ultrasonic pulse from the farther surface of the tube, and all those reflected ultrasonic pulses received between the aforementioned reflected ultrasonic pulses.

16. A method as claimed in claim 12 in which the time during which the amplitude of each reflected ultrasonic pulse exceeds a preselected minimum amplitude is measured by using the electrical signal generated in the probe by the reflected ultrasonic pulses to gate clock pulses, so as to pass clock pulses all the time that the amplitude of the electrical signal is above a preselected minimum amplitude corresponding to the said preselected minimum amplitude of the reflected ultrasonic pulses, and summing the clock pulses which are passed.

17. A method of detecting the presence of flaws in tubes using ultrasonic pulses comprises the steps of scanning an ultrasonic probe across a smoothly contoured surface of the tube; periodically transmitting an ultrasonic pulse into the wall of the tube and receiving a succession of reflected ultrasonic pulses resulting from each transmitted ultrasonic pulse; measuring the total pulse width of the said succession of reflected ultrasonic pulses resulting from each transmitted ultrasonic pulse by measuring the time period during which the amplitude of each reflected ultrasonic pulse exceeds a preselected minimum amplitude and summing the time periods for those reflected ultrasonic pulses resulting from each transmitted ultrasonic pulse; and comparing the total pulse width of each succession of reflected ultrasonic pulses with a predetermined standard total pulse width representative of a flaw-free tube.

18. A method as claimed in claim 17 in which the total pulse width measured is that of the first reflected ultrasonic pulse from the nearer surface of the tube, the first reflected ultrasonic pulse from the farther surface of the tube, and all those reflected ultrasonic pulses received between these two reflected ultrasonic pulses.

19. A method as claimed in claim 18 in which each transmitted ultrasonic pulse triggers a strobe signal which ensures that only those reflected ultrasonic pulses arriving at the probe during the subsequent preset period of time are analysed.

20. A method as claimed in claim 17 in which the time during which the amplitude of each reflected ultrasonic pulse exceeds a preselected minimum amplitude is measured by using the electrical signal generated in the probe by the reflected ultrasonic pulses to gate clock pulses, so as to pass clock pulses all the time that the amplitude of the electrical signal is above a preselected minimum amplitude, corresponding to the said preselected minimum amplitude of the reflected ultrasonic pulses, and summing the clock pulses which are passed.

References Cited

UNITED STATES PATENTS

| | | | |
|---|---|---|---|
| 3,436,958 | 4/1969 | Proctor | 73—67.6 |
| 3,485,087 | 12/1969 | Brech | 73—67.7 |

FOREIGN PATENTS

| | | | |
|---|---|---|---|
| 815,071 | 6/1959 | Great Britain | 73—67.7 |

RICHARD C. QUEISSER, Primary Examiner

C. E. SNEE III, Assistant Examiner